United States Patent
McGlamery et al.

(10) Patent No.: US 7,165,723 B2
(45) Date of Patent: Jan. 23, 2007

(54) SYSTEM AND METHOD FOR THE PROCESSING OF MICR DOCUMENTS THAT PRODUCE READ ERRORS

(75) Inventors: David Craig McGlamery, Charlotte, NC (US); Kathryn Gerrald Harrington, Fort Mill, SC (US)

(73) Assignee: Bank Of America Corporation, Charlotte, NC (US)

( * ) Notice: Subject to any disclaimer, the term of this patent is extended or adjusted under 35 U.S.C. 154(b) by 153 days.

(21) Appl. No.: 10/707,669

(22) Filed: Dec. 31, 2003

(65) Prior Publication Data
US 2005/0139670 A1    Jun. 30, 2005

(51) Int. Cl.
*G06K 7/08* (2006.01)
(52) U.S. Cl. .................. 235/449; 235/379; 235/493
(58) Field of Classification Search .............. 235/379, 235/380, 437, 449, 454, 493, 494; 382/112, 382/137, 139, 140; 705/67, 75, 44, 45
See application file for complete search history.

(56) References Cited

U.S. PATENT DOCUMENTS

| | | | | |
|---|---|---|---|---|
| 4,523,330 A | * | 6/1985 | Cain .......................... | 382/140 |
| 4,555,617 A | * | 11/1985 | Brooks et al. .............. | 235/379 |
| 5,678,046 A | * | 10/1997 | Cahill et al. ............... | 707/200 |
| 5,740,271 A | * | 4/1998 | Kunkler et al. ............ | 382/137 |
| 5,754,673 A | * | 5/1998 | Brooks et al. .............. | 382/112 |
| 5,917,965 A | * | 6/1999 | Cahill et al. ............... | 382/305 |
| 5,940,844 A | * | 8/1999 | Cahill et al. ............... | 715/526 |
| 5,963,659 A | * | 10/1999 | Cahill et al. ............... | 382/139 |
| 6,181,837 B1 | * | 1/2001 | Cahill et al. ............... | 382/305 |
| 6,351,553 B1 | | 2/2002 | Hayosh | |
| 6,574,377 B1 | * | 6/2003 | Cahill et al. ............... | 382/305 |
| 7,092,561 B1 | * | 8/2006 | Downs, Jr. ................. | 382/139 |
| 2001/0051921 A1 | | 12/2001 | Garner et al. | |
| 2004/0133516 A1 | * | 7/2004 | Buchanan et al. .......... | 705/42 |

(Continued)

FOREIGN PATENT DOCUMENTS
EP    0671696    9/1995

OTHER PUBLICATIONS

Patent Abstracts of Japan, vol. 1998, No. 2 (Jan. 30, 1998), & JP 09 282387A (Glory Ltd), Oct. 31, 1997, abstract.
Bank of America Corporation, International Application Ser. No. PCT/US004/043832, "International Search Report", (May 19, 2005).

(Continued)

*Primary Examiner*—Michael G. Lee
*Assistant Examiner*—Kumiko C. Koyama
(74) *Attorney, Agent, or Firm*—Moore & Van Allen PLLC; Steven B. Phillips

(57) ABSTRACT

System and method for the processing of MICR documents that produce read errors. MICR documents are read and sorted to a destination pocket for processing subject to a determination that existing digit errors do not prevent the routing of the document. In example embodiments, an error does not prevent the routing of the document if it is not related to the routing/transit field. An optical character recognition (OCR) process is performed on the stored, electronic image of the document to correct digit errors in the stored data read from the documents. If a determination is mode that the correction cannot be determined through the OCR process, the image and corresponding MICR data is displayed on a user terminal, for manual correction by reference to an image of the document, rather than the document itself.

12 Claims, 4 Drawing Sheets

OTHER PUBLICATIONS

Bank of America Corporation, International Application Ser. No. PCT/US004/043832, "Written Opinion", (May 19, 2005).

Bank of America Corporation et al., "International Preliminary Report on Patentability," Jul. 13, 2006.

* cited by examiner

SYSTEM AND METHOD FOR THE PROCESSING OF MICR DOCUMENTS THAT PRODUCE READ ERRORS

BACKGROUND OF INVENTION

Financial institutions have established various processes and associations related to the exchange of documents evidencing monetary transactions. Such documents are generally encoded with magnetic ink so that information from the documents can be read by machine. Such documents have thus become known as magnetic ink character recognition (MICR) documents. Check processing and sorting systems have also been developed in which a check or similar MICR document has its image captured and stored electronically. Such an image can be archived so that it is indexed or joined with its accompanying data from a MICR read. In addition, up until now, MICR documents have also been captured photographically for storage in microfilm format. This feature is being removed as electronic image processing and retrieval replaces the use of microfilm.

The typical high-speed processing of documents having MICR data, for example, checks, includes reading and storing a MICR line, endorsing the document with applicable information, imaging the item so that the image can be stored in an archive facility, and sorting items for processing. Items for which the MICR reads properly, and for which no errors are detected in the data, sort to pockets for routine processing. Any items with a failed MICR read or an exception are typically sorted to a reject pocket and are handled through an exception process. The exception process typically includes attempting to read the MICR with an alternate, slower type of reader to achieve a better read rate, and if that fails, manually reviewing the paper document and keying in the appropriate data.

FIG. 1 is a flow chart which illustrates the current process for processing MICR documents at many financial institutions. In FIG. 1, various steps in the process are represented by process blocks. Process blocks can also represent stopping points or paths for different types of items. At block 102, items with MICR data are loaded into a high-speed processor. The MICR data on the item is recognized and captured by a read head. The data is transferred to a file for storage with indicators that signify which fields have apparently read correctly, and which ones have failed to read. Logic failures are also detected. A logic failure occurs when data has apparently been captured successfully, but makes no sense, so it must be assumed that the data as captured is erroneous. At block 102 of FIG. 1, items also typically pass through an endorsement feature, which typically puts a date, location of scan, and other data related to the financial institution performing the processing. The item optionally can move through a microfilm unit to have a photographic image captured. Next, the item moves under and over image scanners. An image of the item (front and back) is created and stored.

At block 104, based on the read of the document, instructions are executed regarding the disposition of the item. All items with read failures or logic issues are passed to a reject pocket at block 106. A correction process then takes place at block 108. Where an item reads good, with good data, at block 104, the item goes through high speed pocketing at block 110. In a typical check processing environment, based on the read of the MICR data, items are sorted into pockets as "on-us" items, as shown at block 112, or "transit" items, as shown at block 114. An on-us item is an item that is drawn on the financial institution doing the processing. On-us items will typically be forwarded to other locations within the financial institutions own franchise. Transit items are checks drawn on other financial institutions, and are pocketed for delivery to those institutions.

The data correction process, 108, also results in items eventually being sorted into corrected, on-us items 116, and corrected, transit items, 118. Items from the high-speed process are then merged, eventually, with items from the correction or "reject repair" process at block 120. Thus, both the reject items and the good items, are typically eventually sorted to their destinations, shown consolidated at blocks 122 and 124.

In a typical financial institution, large numbers of MICR items must go through the correction process, since any error in the read of any field causes an item to sort to a reject pocket. In many cases, the correction process includes the use of check mender equipment to place correction strips on the bottom of each document so new, readable MICR can be placed on each document. The resulting delay considerably reduces the processing time for each batch of MICR items processed by a financial institution.

SUMMARY OF INVENTION

The present invention, disclosed herein by way of example embodiments, can improve the processing time for large numbers of MICR encoded documents within a financial institution. Through use of an embodiment of the invention, the number of items which are pocketed as rejects can be significantly reduced. This reduction can be accomplished due to the realization that only the routing/transit field from the MICR data of an item needs to be read correctly in order for it to be properly pocketed. Additionally, speed of correction for documents which are pocketed as rejects is improved through the use of an image based correction process which can be referred to herein as MICR image correction or "MIC." Embodiments of the invention can also be used to correct image data received electronically when paper documents have been scanned elsewhere.

According to some embodiments of the invention, a method of processing a MICR encoded document and/or its image, where the document has produced one or more errors in a stored data field includes the receiving of an image of the document and an optical character recognition (OCR) process that is performed on the stored, electronic image. The portion of the document to which the OCR process is applied corresponds to the stored data field. For example, if the error is related to an account number, the OCR process is performed on a snippet of the document that includes the account number. Where paper items have been received and stored locally, the process may begin with the imaging of the document. An example method of the invention in such a case can further include routing the document to a destination pocket and subsequently to a destination subject to a determination that the error(s) do(es) not prevent the routing of the document. In typical embodiments, an error does not prevent the routing of the document if it is not related to the routing/transit field. Embodiments of the correction process can be applied to image data received from another institution which scanned the MICR documents.

The OCR process result is used to apply a correction to the error in the stored data field. This correction can be based on a comparison of the result of the OCR process and the digits within the stored data field which have been captured, albeit only partially or incorrectly. If a determination is made that the correction cannot be successfully determined by the comparison with the result of the OCR process, the image and MICR data is displayed on a user terminal, for manual correction, albeit by reference to an image of the document, rather than the document itself.

In some embodiments, an improved correction process can be applied when the error appears in a stored data field which has two or more corresponding areas within the image of the item. For example, if the error is in an amount, two results of an OCR process can be used. One result can be obtained from optically scanning the MICR line, and another result can be obtained from optically scanning a written amount. In some cases, still another OCR process result can be obtained if the amount is listed both numerically, and written out.

A system for processing MICR encoded documents according to embodiments of the invention can include a sorter to sort and read the documents and route documents to a destination pocket when an error in a stored data field does not prevent the routing. Such a sorter can be operatively interconnected with a computing platform to provides the OCR processing and apply corrections to the error in the stored data field based on a comparison of the result of an OCR process and the data in the stored field. The computing platform can also provide for the storage and routing of the images for manual correction at user terminals as required. Computer program instructions, computer programs or computer code, possibly in the form of a computer program product can implement portions of the invention. These computer program code instructions can operate a computing platform which controls a sorter and other hardware within the system. With such a system, the handling of physical items in order to perform reject repair can be eliminated. Furthermore, many items having errors, specifically errors which do not prevent the routing of the items, can be routed to a destination and any error correction required, whether automated or manual, can be performed using only the images of the items. Additionally, data referring to documents that were scanned elsewhere can be corrected. Thus, overall check processing time can be reduced.

DETAILED DESCRIPTION

Figure 1:
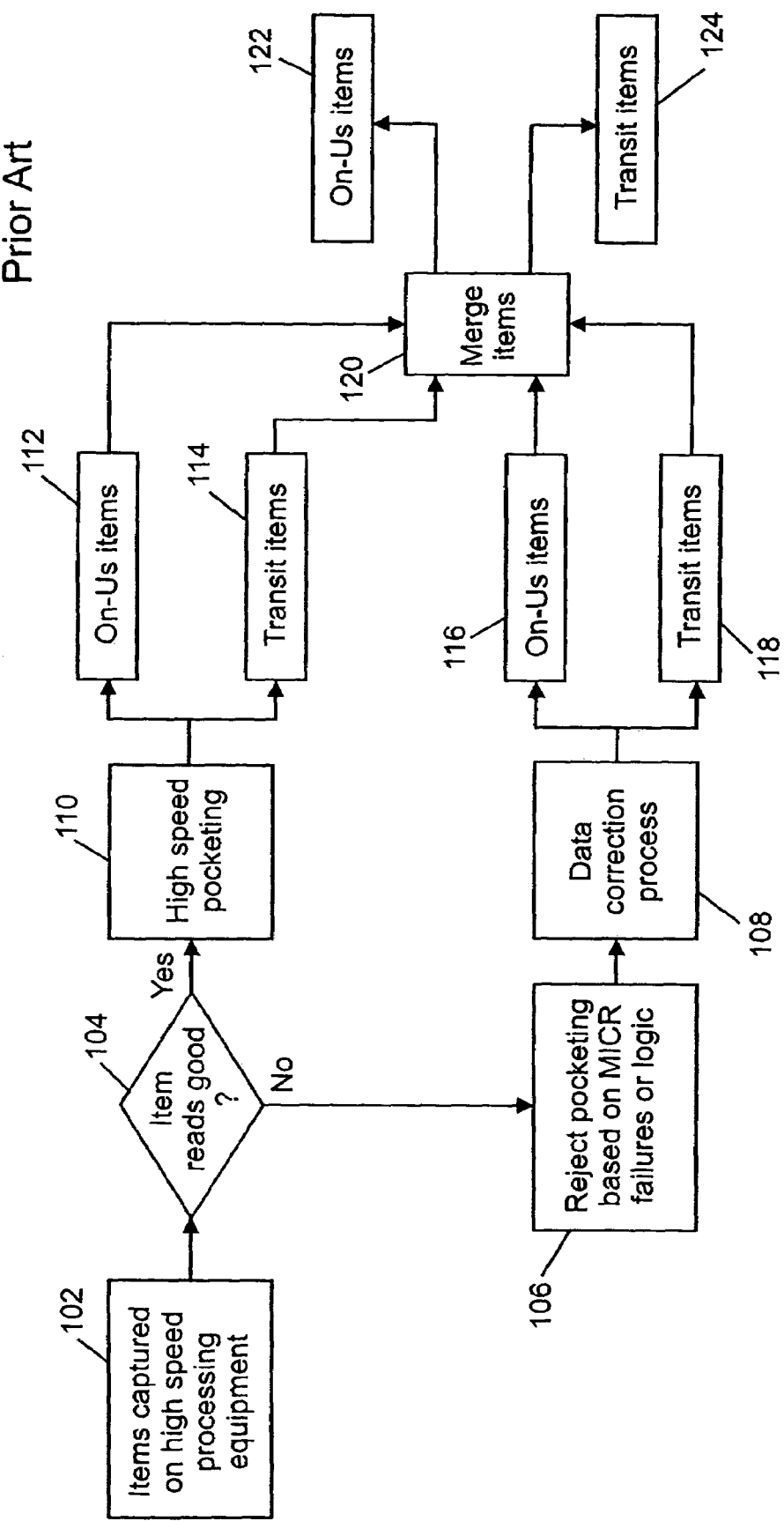
FIG. 1. is a flow diagram which illustrates a process in which all MICR encoded items having MICR failures or other errors are routed to a reject pocket for a physical data correction process.

The present invention will now be described in terms of specific, example embodiments. It is to be understood that the invention is not limited to the example embodiments disclosed. It should also be understood that not every feature of the methods and systems described is necessary to implement the invention as claimed in any particular one of the appended claims. Various elements and features of various embodiments are described to fully enable the invention. It should also be understood that throughout this disclosure, where a process or method is shown or described, the steps of the method may be performed in any order or simultaneously, unless it is clear from the context that one step depends on another being performed first. With respect of flow charts, block diagrams and flow diagrams, not every possible signal flow, data path, or process block is shown. Rather, for clarity, only those important to the inventive concepts being discussed relative to the drawing may be illustrated, although others may be discussed in this description.

The meaning of certain terms as used generally in the context of this disclosure should be understood as follows. Terms such as "document" or "MICR encoded document" and the like are meant to refer to any document which tends to be handled and sorted in large volumes based on MICR information printed thereon. In the typical context, such documents are checks which order a bank to pay a certain sum to the order of another individual or entity. However, other documents evidencing financial transactions relating to banking, and for that matter, other kinds of documents, can be "MICR encoded documents." Even in the typical banking context, deposit slips are sometimes MICR encoded, read and sorted in a fashion similar to checks.

Terms like "bank" and "financial institution" are used herein in their broadest sense. Financial institutions that process transactions and documents of the types discussed can include stock brokerages, credit unions, and other types of institutions which are not strictly "banks" in the historical sense. The use of terms such as "bank" or "financial institution" herein is meant to encompass all such possibilities.

References will be made at various places within this disclosure to information contained in a "stored data field" or information within such a field being "corrected." As previously discussed, this terminology refers to the idea of correcting information about MICR encoded documents which is stored in data structures for retrieval and manipulation. There are many ways to design a system to accommodate the storage of this information, as well as the storage of electronic images of documents such as checks. Reference will be made herein to updating strings and user bytes which either are or refer to such fields in systems which process MICR documents such as checks. In example embodiments, this terminology refers to information stored in what is commonly known as a "check image management system" (CIMS) and within a "check processing control system" (CPCS). Such systems are well known within the banking industry by those who work in the financial data processing fields. Such data processing systems have historically been produced by the International Business Machines Corporation and marketed to banking and financial companies. Through the use of such systems, check images and index information referring to the check images, which typically includes the MICR data, can be stored in a single file according to an industry standard "check image export" (CIE) format. CIE has been used for many years by many banks to archive check images for their own internal use. Images and index information in such a system can be stored in the same file or separated. In some environments, the index information is separated and stored in an electronic cash letter (ECL) for communicating between financial institutions for the purpose of settlement. Index information can also be stored with electronic images in an "image cash letter" (ICL) to provide for the truncation of the paper documents. Again, these systems and techniques are well known by those of ordinary skill in the financial information technology arts.

Figure 2:
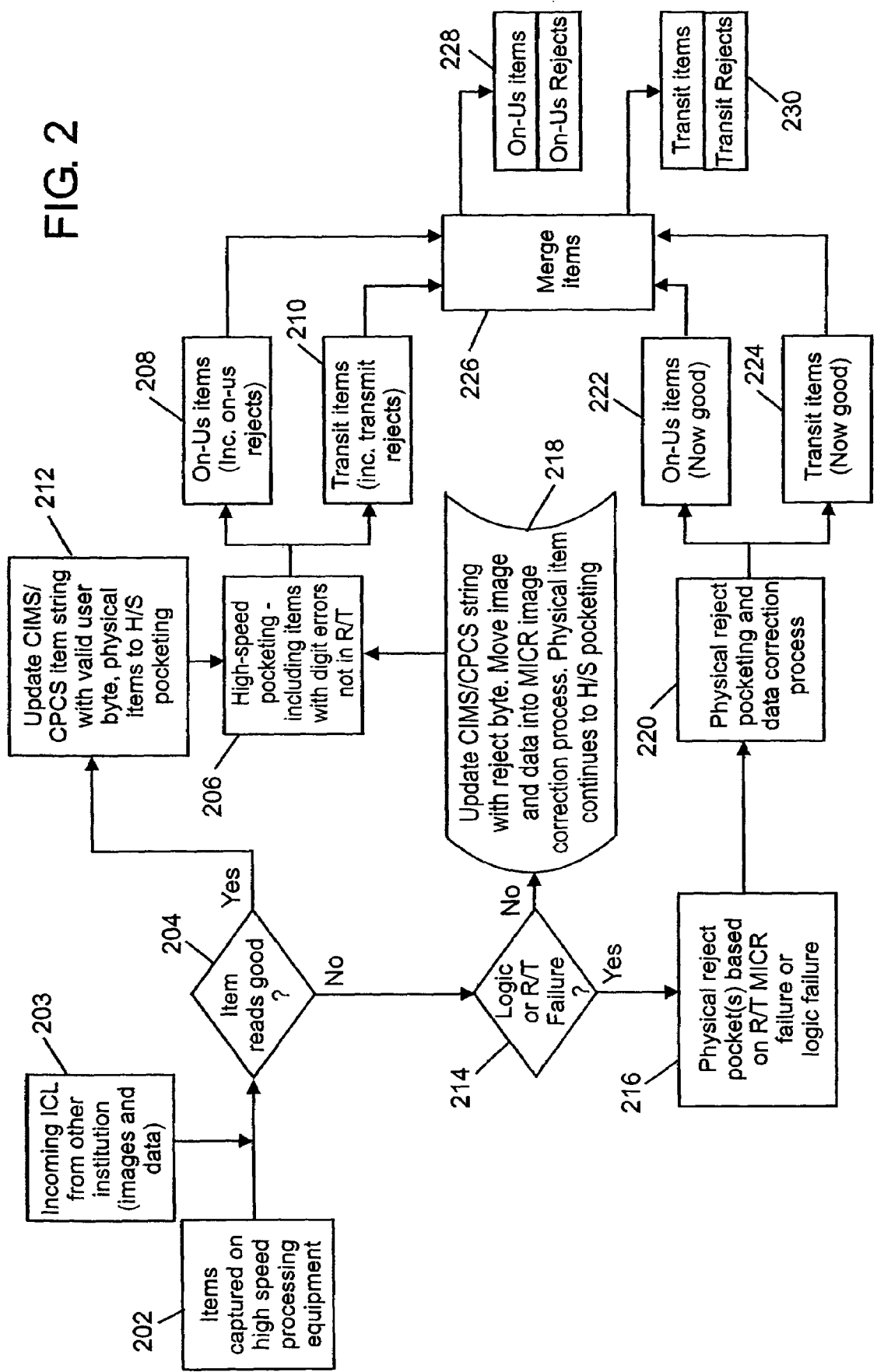
FIG. 2. is a flow diagram which illustrates the processing of items according to embodiments of the invention.

FIG. 2 is a flow diagram and process diagram which illustrates the flow, 200, of items according to some embodiments of the invention. FIG. 2 also shows some of what happens to stored MICR data according to some embodiments of the invention. Further detail on how the data is handled is covered in FIGS. 3 and 4. At block 202 of FIG. 2, MICR encoded items are loaded into a high-speed processor. As before, the processor reads the MICR data and the data is transferred to a file for storage. An item is endorsed, an image is created and stored, and in some cases, a photographic image is made for microfilm purposes. Block 203 represents an incoming image file from another financial institution. The logic for the correction process is the same as with paper processing. The incoming information may only be electronic as the future of check processing changes from paper to image. The MICR data for the images as captured by the sending bank may still contain MICR digits errors from the sending bank MICR capture equipment. The correction process will still follow the logic as described in FIG. 2 using the same image and image technology, only without on-us paper and without any transit images or items. As before, a determination is made at block 204 as to whether the item reads or was read good. If a locally sorted paper item reads good, it is pocketed at block 206. Pockets eventually break down into a sort of items into on-us items at block 208, and transit items at block 210. In the example of FIG. 2, good items also cause a valid user byte to be generated in the CIMS/CPCS system at block 212.

In process 200 of FIG. 2, a determination is made at block 214 as to the type of error, which occurred during the read of an item. In the case of a logic failure related to a locally sorted paper item, the item is routed to the traditional physical reject process which commences at block 216 and the item is assigned a reject user byte. If a digit error has occurred, that is an error in which a digit within a field was not able to be read, the item is again routed to the physical reject process if the error occurs in the routing/transit (R/T) field and the item is assigned a reject user byte. In such a case, the item cannot be sorted since the R/T field determines the final destination of the item. However, if the digit failure or digit error occurs in any other fields related to the MICR encoded document, the item can still be sorted and pocketed at high-speed. Thus, if the error as determined at block 214 is found not to be a logic or routing/transit failure, the item is sorted into a pocket at block 206, in the same manner as a good item. An on-us or transit reject user byte will then be assigned to the item indicating the item has sorted good, but needs further attention for corrective purposes.

At block 218 of FIG. 2, the MICR image correction process takes place. The process can be the same regardless of where the paper item was first read and sorted. CIMS/CPCS systems will recognize all the items that have a on-us or transit reject user byte. It is or was known at this point into which pocket the item needs to be or has been sorted, since the information needed to sort the item is generally determined from the routing/transit number. Thus, in the case of locally sorted paper items, at the end of the high-speed sort, items are pocketed as on-us items, 208, which include good on-us items and on-us rejects, and transit items, 210, which include good transit items and transit rejects.

As in the prior art, paper rejects are handled with a physical reject pocketing and correction process at block 220. This correction process results in on-us items pocketed at block 222 and transit items pocketed at block 224. In each case, these items will now have good data stored within CIMS and CPCS. These items are merged with the high-speed sorted items at block 226. Once the process has been completed for a batch of MICR encoded documents, the documents are stored in on-us pockets 228 and transit pockets 230, where in each case the physically pocketed items include both good items and reject items. The documents can now proceed to their destinations and any MICR data correction necessary can be provided through the high-speed MICR image correction process according to embodiments of the invention. It should be noted that in the case of transit items, MICR data is frequently exchanged via an electronic cash letter in parallel with the presentment of paper documents. Thus, a financial institution to which transit items are to be presented will be able to identify and acquire the correct MICR information notwithstanding the fact that the paper documents may not read error free.

Figure 3:
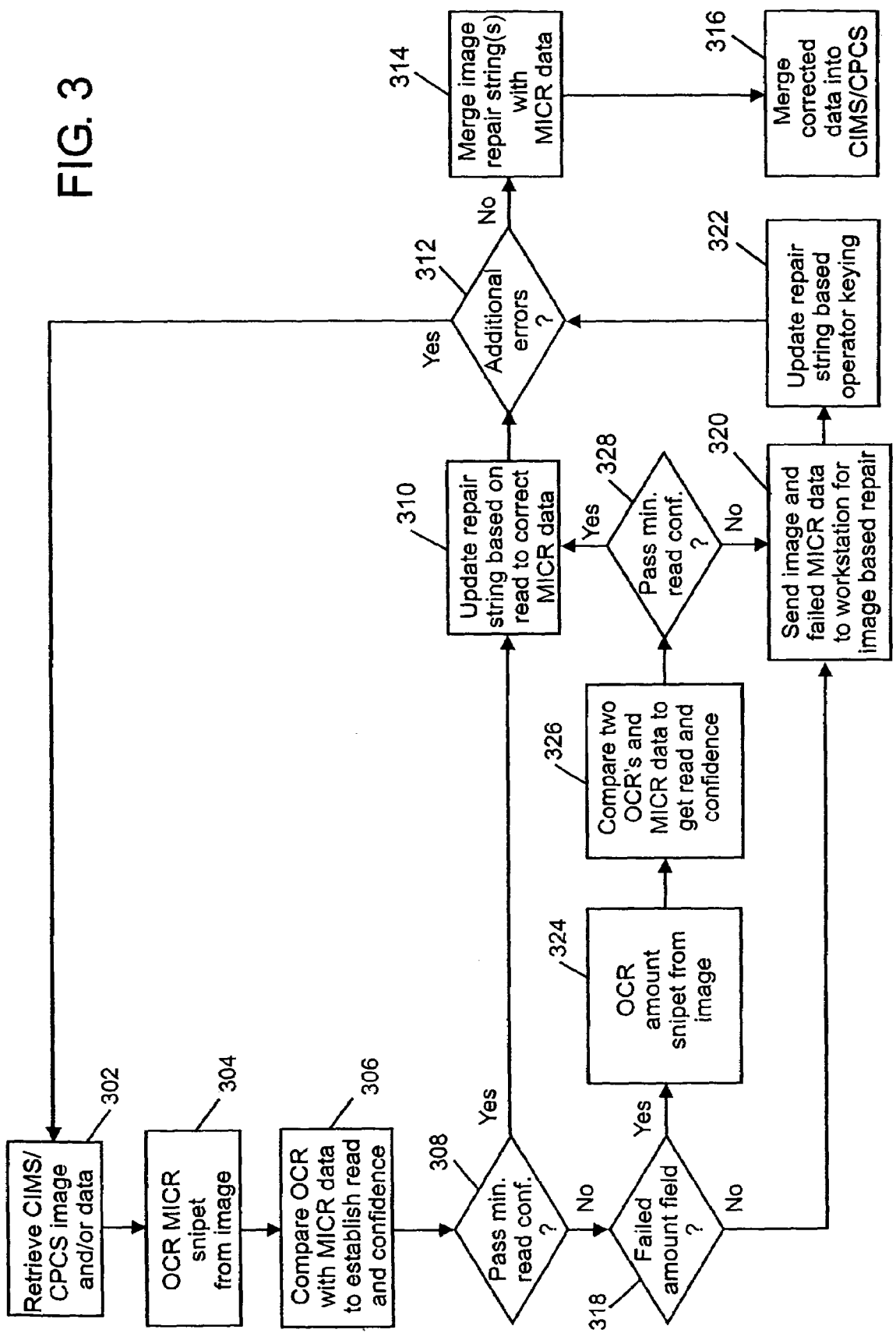
FIG. 3. is a flow chart which illustrates a method of processing items according to some embodiments of the invention.

FIG. 3 is a flow chart illustrating a process, 300, for MIC reject repair in an example system based on CIMS and CPCS. The data fields being repaired can correspond to paper items that were first sorted either locally, or at another institution. At block 302 the appropriate image and MICR information is retrieved from CIMS and CPCS. This MICR information includes the various stored data fields, and what in CIMS and CPCS parlance is referred to as a "string" that includes a "user byte." In example embodiments of the invention, the string designates an item as valid, as an on-us reject, as a transit reject. The string can also designate the item as simply a reject if it is a paper reject requiring paper reject processing in the manner of the prior art. At block 304 an optical character recognition process is performed on a snippet from the image. On a first pass, in example embodiments, this snippet is at least one portion of the image, the portion which includes the MICR printed numbers which correspond to the stored data field in question. The OCR process reads the snippet optically, as opposed to with a MICR read head. At block 306, the result of the OCR process is compared with the MICR data in the stored data field to determine the likely, correct content of the field. This determination can be made in such a way that the probability that the field is actually supposed to be what is determined can be assigned a confidence level.

A system according to embodiments of the invention can be set up to test for a certain minimum confidence level as shown at block 308, before allowing a correction to be applied to the stored data field. In effect, the validity of the correction proposed is subject to having been successfully determined by the comparison, within a given confidence. This forces the system to only allow the MIC error correction if there is a substantial likelihood that the error correction will be successful in that the correct contents of the stored data field will be determined and restored. In some embodiments, required confidence levels can be set by the operators of a system. Assuming the minimum read confidence level is passed at block 308, a reject repair string based on the comparison of the OCR result and the data in the stored field is updated at block 310. At block 312, the process repeats if there are additional errors to be corrected. If not, as in the case where all needed reject repair items have been corrected, the image repair string(s) are merged with the MICR data at block 314. In example embodiments, all the corrected MICR data is then merged into CIMS/CPCS at block 316.

If the minimum read confidence level is not achieved at block 308 of FIG. 3, a test is made at block 318 to determine if the stored data field with the failure corresponds to the amount field for the item. If not, the image and the failed MICR data are sent to a workstation for image-based repair at block 320. A repair string is updated based on operator keying at block 322. The process then returns again to block 312 where it repeats if there are additional items to be corrected. Note that in this case, an operator only needs to correct one item at a time, and furthermore works with an image of the document rather than the document itself. Thus, within the steps shown in FIG. 3, working with paper rejects has been completely eliminated.

Returning to block 318, if the error or failure is in an amount field, at least one additional OCR process result is obtained from a portion of the image at block 324. Thus, at least two portions of the image have an OCR process performed for a comparison of the result of an OCR process with the contents of a stored data field when the field corresponds to an amount. In this example embodiment, the OCR process is performed on the printed MICR and on a written, numerical amount. All three of these pieces of information can be compared at block 326. Note that depending on the OCR algorithms and processes used, in most cases it is possible to perform an OCR process on a written out amount as well as a printed numerical amount. This would involve at least three portions of the image having OCR results that can be compared with data in a stored field. In any case, the comparison is again used to determine how to correct an error in the stored field. At block 328, the result arrived at by this comparison is also checked against a minimum read confidence level. If the minimum level is achieved, the reject repair string data is updated at block 310. Otherwise, the image is sent to a workstation for image-based repair at block 320, as previously described.

Any of various known OCR algorithms can be applied to the process described in FIG. 3 to achieve the desired result. Specific OCR products are available that have been designed to optically determine and read printed MICR characters, handwriting, printed amounts, etc. It is also known how to compare the results of more than one algorithm, or the results of an algorithm with stored values and make determinations within certain confidence intervals. One way of accomplishing this is via a voting algorithm. Optical character recognition is a mature art and it is readily understood in the data processing arts how to apply it to achieve various results. Various companies produce OCR products and systems for varied applications, for example, ScanSoft, Inc. of Massachusetts, in the United States.

Figure 4:
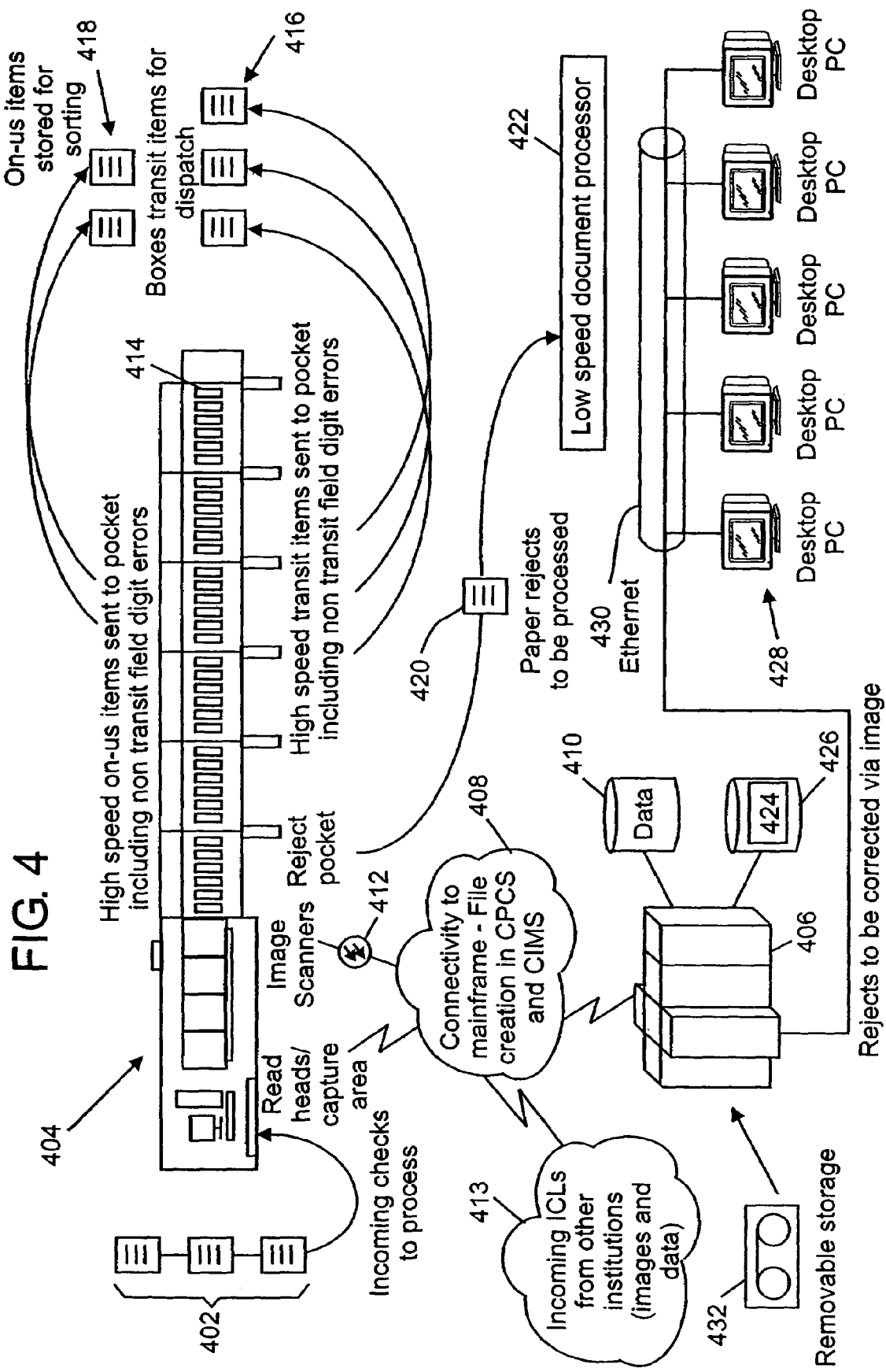
FIG. 4. is a block diagram of a system which handles MICR encoded items according to some embodiments of the invention.

FIG. 4 presents a system and network block diagram, which illustrates the operating environment for at least some example embodiments of the invention. Incoming paper items, in this case checks, are shown at 402. The documents are sorted and read at a high-speed sorter, 404, for example, an IBM 3890 high-speed sorter. The checks pass through a capture area where read heads capture the MICR data and organize it into stored data fields. This data is transmitted to computer system 406 via connectivity 408. This connectivity can be provided by any of various types of networks, for example, IBM System Network Architecture (SNA), an internal Internet protocol (IP) network, or a local area network (LAN). Computing system 406 stores the MICR data and any other required data on fixed storage media 410.

In the example of FIG. 4, electronic images 412 are captured, forwarded to the computing system and stored. In the case of image cash letters, an image file 413 with string data and on-us items only would simply be presented to the bank for settlement. No paper would physically be exchanged. In this case, all activity resides (data and images) only in the computer based portion of FIG. 4. High-speed sorter 404 sorts all items which can be sorted, and routes the items into pockets 414. The sorted items include items with digit errors, as long as the digit errors are not in the routing/transit field. The sorting process allows items to eventually be packaged for movement to appropriate areas. In the example of FIG. 4, boxed transit items are shown at 416 and boxed on-us items are shown at 418. Items which cannot be routed, for example paper reject 420, are routed to a low-speed document processor, 422, for processing as a paper reject. Note that items that have been sorted for delivery to appropriate destinations, 416 and 418, can now proceed through the normal process, while the data is corrected using techniques based in computing system 406 and images stored in fixed storage 410. The techniques previously discussed relative to creating repair strings based on optical character recognition results and comparisons are directed and controlled by computer program code 424, at least in part stored in and read from fixed storage 426. Note that in order to handle cases where minimum confidence levels cannot be met by the OCR based algorithms, a number of operator terminals, 428, are interfaced to computer system 406 by Ethernet 430.

It cannot be overemphasized that the system of FIG. 4 is provided as an illustrative example only. There are numerous types of document sorting machines that can be used to provide the sorting/capture/imaging functions. Most sorters typically have conventional document diverting mechanisms which route the documents to the various pockets. Sorting instructions to cause the documents to be routed are received from a processor within the sorting machine, or from an external computing platform, or sometimes both depending on the particular operations being carried out at any particular time. The computing platform can be a mainframe, server, workstation, and even a desktop or personal computer given the processing power that has been achieved in such devices in recent years.

In any event, some embodiments of the invention can be implemented through extensive use of computer program products, or computer program instructions to carry out methods according to the invention. These instructions in combination with a computing platform processor and other devices form the means to carry out embodiments of the invention. These computer program instructions may be part of a computer program or multiple programs which are supplied as a computer program product. Such a computer program product may take the form of a computer readable media that allows computer program instructions to be loaded into computing platforms. In the example operating environment of FIG. 4, a computer program product in the form of a medium containing the appropriate instructions is shown as removable storage medium 432.

In addition to being supplied in the form of a machine readable medium or media, computer program instructions which implement the invention can also be supplied over a network. In this case the medium is a stream of information being retrieved when the computer program product is downloaded. Computer programs which implement embodiments of the invention can reside on any medium that can contain, store, communicate, propagate, or transport the program for use by or in connection with any computing platform or instruction execution system, apparatus, or device. The medium may be, for example but not limited to, an electronic, magnetic, optical, electromagnetic, infrared, or semiconductor system or device. For example, the computing platform, storage mediums, connectivity, and sorting machine, can all be combined into one large device and the computer program instructions could be stored within an optical, magnetic, or electronic module type storage devices.

In order to more fully enable the present invention, the following details are presented on how strings within a CPCS system are updated and managed according to some example embodiments of the invention. As previously discussed, the invention can be implemented in other types of systems. Detail on CPCS and CIMS is presented as an example only. In an example CPCS system, good items that are sorted to pockets build an "I-String" within CPCS with a valid user byte. Items with digit errors that do not prevent sorting and all paper reject items build on the same "I-String" but, with other types of CPCS user bytes.

Items that are on-us with digit errors are sorted and build an "On-Us Reject String" within CPCS with an "On-Us Reject" user byte. Items that are transit with digit errors are sorted and build a "Transit Reject String" within CPCS with a "Transit Reject" user byte. Reject items, that is items that have digit errors in the routing/transit field or have other problems are sorted to a reject or "R" pocket for low speed processing and build a "Reject D-string" within CPCS with a user byte that signifies a paper reject. Thus, the CPCS entry will end and create four closed strings: I-String, On-Us Reject String, Transit Reject String and a Reject D-String.

Transit reject string specified images and data will download to the OCR process. Certain digit errors will be corrected via this process if the logic can correct a failed digit with a specified confidence level. Similarly, on-us reject string specified images and data download to the OCR process. Items with digits failing in the amount field will go through an additional OCR/MICR/written amount verification process to determine if handwriting, printed numbers, or both can create a good read. Images and data for remaining items will download to workstations for digit correction via key entry by an operator referencing an image rather than a paper document. In some embodiments, on-us items go through the process of the invention with a low priority compared to transit items.

Once all the transit rejects and/or all on-us rejects have been corrected for a specified entry, the "I-String" can be merged with a repair string(s) to create an Adjusted I-String or an "M-String" indicating the items have been corrected. In at least some embodiments, a final merge for all items in a batch waits until reject D-string specified items have been corrected. However, since employing an embodiment of the invention reduces the number of reject D-string items, the time involved in processing the batch is also reduced.

Specific embodiments of an invention are described herein. One of ordinary skill in the computing, networking, and financial information technology arts will quickly recognize that the invention has other applications and can be used in other environments. In fact, many embodiments and implementations are possible. The following claims are in no way intended to limit the scope of the invention to the specific embodiments described above.

The invention claimed is:

1. A method of processing information about a magnetic ink character recognition (MICR) encoded document having associated therewith a stored image and an error in a stored data field read from the MICR encoded document, the method comprising:
    determining if the stored data field includes routing information;
    forwarding at least one of the stored image and the document when the stored data field has the error but does not include routing information;
    performing an optical character recognition (OCR) process on at least one portion of the stored image of the document, wherein the at least one portion substantially corresponds to the stored data field;
    applying an image-based correction to the error in the stored data field using a comparison of a result of the OCR process and the stored data field, wherein the correction is applied subject to a minimum confidence level; and
    displaying only the image to an operator for correction when the minimum confidence level for the correction is not met.

2. The method of claim 1 wherein the performing of the OCR process on the at least one portion of the image of the document further comprises:
    determining if the stored data field includes an amount; and
    performing the OCR process on a plurality of portions of the stored image of the document, wherein each of the plurality of portions corresponds to the amount.

3. The method of claim 2 wherein the plurality of portions consists of three portions substantially corresponding to a written amount, a MICR amount, and printed numerical amount.

4. A computer-readable medium computer program product to enable at least a portion of the processing of information about magnetic ink character recognition (MICR) encoded documents, a plurality of the MICR encoded documents each having associated therewith an error in a stored data field, the computer-readable medium comprising:
    instructions for receiving images of the MICR encoded documents;
    instructions for determining if the stored data field associated with a document includes routing information and forwarding at least one of a stored image and the document when the stored data field has the error but does not include routing information;
    instructions for performing an optical character recognition (OCR) process on at least one portion of the stored image of the document, wherein the at least one portion substantially corresponds to the stored data field containing the error;
    instructions for applying an image-based correction to the error in the stored data field using a comparison of a result of the OCR process and the stored data field, wherein the correction is applied subject to a minimum confidence level; and
    instructions for displaying only the stored image to an operator for correction when the minimum confidence level for the correction is not met.

5. The computer-readable medium of claim 4 wherein the instructions for performing the OCR process on the at least one portion of the image of the document further comprise:
    instructions for determining if the stored data field includes an amount; and
    instructions for performing the OCR process on a plurality of portions of the stored image of the document, wherein each of the plurality of portions corresponds to the amount.

6. The computer-readable medium of claim 5 wherein the plurality of portions consists of three portions substantially corresponding to a written amount, a MICR amount, and a printed numerical amount.

7. Apparatus for processing information about magnetic ink character recognition (MICR) encoded documents, a plurality of the MICR encoded documents each having associated therewith an error in a stored data field, the apparatus comprising:
    means for receiving images of the MICR encoded documents;
    means for determining if the stored data field associated with a document includes routing information and forwarding at least one of a stored image and the document when the stored data field has the error but does not include routing information;

means for performing an optical character recognition (OCR) process on at least one portion of the stored image of the document, wherein the at least one portion substantially corresponds to the stored data field containing the error;

means for applying an image-based correction to the error in the stored data field using a comparison of a result of the OCR process and the stored data field, wherein the correction is applied subject to a minimum confidence level; and means for displaying only the stored image to an operator for correction when the minimum confidence level for the correction is not met.

8. The apparatus of claim 7 wherein the means for performing the OCR process on the at least one portion of the stored image of the document further comprises means for performing the OCR process on a plurality of portions of the image of the document, wherein each of the plurality of portions corresponds to an amount.

9. The apparatus of claim 8 wherein the stored data field corresponds to an amount and wherein the plurality of portions consists of three portions substantially corresponding to a written amount, a MICR amount, and printed numerical amount.

10. A system for processing magnetic ink character recognition (MICR) encoded documents comprising:

at least one workstation;

a sorter to sort and read the MICR encoded documents, wherein reading each of a plurality of the MICR encoded documents results in an association therewith of an error in a stored data field; and a computing platform operatively connected to the sorter and the at least one workstation, the computing platform operative to forward a document when the stored data field does not include routing information and to perform an optical character recognition (OCR) process on at least one portion of a stored image of the document after the document has been forwarded, and apply an image-based correction to the error in the stored data field using a comparison of a result of the OCR process and the stored data field, wherein the correction is applied subject to a minimum confidence level;

wherein only the stored image is displayed to an operator for correction when the minimum confidence level for the correction is not met.

11. The system of claim 10 wherein the computing platform is further operable to perform the OCR process on a plurality of portions of the stored image of the document in order to apply the correction to the error and wherein each of the plurality of portions corresponds to an amount.

12. The system of claim 11 wherein the plurality of portions consists of three portions substantially corresponding to a MICR amount, a written amount and a printed numerical amount.

* * * * *

UNITED STATES PATENT AND TRADEMARK OFFICE
CERTIFICATE OF CORRECTION

| | | |
|---|---|---|
| PATENT NO. | : 7,165,723 B2 | Page 1 of 1 |
| APPLICATION NO. | : 10/707669 | |
| DATED | : January 23, 2007 | |
| INVENTOR(S) | : David Craig McGlamery | |

It is certified that error appears in the above-identified patent and that said Letters Patent is hereby corrected as shown below:

Column 10, lines 19 and 20, Claim 4, please delete "computer program product".

Signed and Sealed this

Fifth Day of June, 2007

JON W. DUDAS
*Director of the United States Patent and Trademark Office*